United States Patent
Carrasco et al.

(10) Patent No.: US 11,747,012 B2
(45) Date of Patent: Sep. 5, 2023

(54) SYSTEMS AND METHODS FOR PREVENTING EXCESSIVE CASCADE BOILER SYSTEM HEATING OVERSHOOT

(71) Applicant: Rheem Manufacturing Company, Atlanta, GA (US)

(72) Inventors: Hiram Osuna Carrasco, Oxnard, CA (US); Jorge Miguel Gamboa Revilla, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 18/092,221

(22) Filed: Dec. 31, 2022

(65) Prior Publication Data

US 2023/0142833 A1    May 11, 2023

Related U.S. Application Data

(62) Division of application No. 17/073,690, filed on Oct. 19, 2020, now Pat. No. 11,561,003.

(51) Int. Cl.
    *F22B 35/18*      (2006.01)
    *G05B 19/4155*    (2006.01)
    *F22B 35/00*      (2006.01)

(52) U.S. Cl.
    CPC .......... *F22B 35/18* (2013.01); *F22B 35/008* (2013.01); *G05B 19/4155* (2013.01); *G05B 2219/50333* (2013.01)

(58) Field of Classification Search
    None
    See application file for complete search history.

(56) References Cited

U.S. PATENT DOCUMENTS

| 5,042,431 A      | 8/1991  | Shprecher et al. |
| 2010/0006042 A1  | 1/2010  | Pitonyak et al. |
| 2012/0095614 A1  | 4/2012  | DeLayo |
| 2015/0345804 A1  | 12/2015 | Ellingwood et al. |

OTHER PUBLICATIONS

Watlow Series 988 Enhanced Software Features (Includes 986, 987, 988 and 989), Watlow Controls, Winona, Minnesota, Oct. 1999, 12 pages.
International Search Report and Written Opinion for PCT Application No. PCT/US2021/055348 dated Jan. 13, 2022.

*Primary Examiner* — Sean Shechtman
(74) *Attorney, Agent, or Firm* — Eversheds Sutherland (US) LLP

(57) ABSTRACT

The disclosed technology includes a controller configured to control an output of one or more boilers to reduce temperature overshoot of the boiler system. The controller can receive temperature data, a threshold temperature value, and a maximum temperature value, and determine whether the temperature of the water in the boiler system is greater than or equal to a threshold temperature. The controller can also determine a number of operating boilers that were operating when the threshold temperature was reached and determine a temperature increment value based on the threshold temperature, the maximum temperature, and the number of operating boilers. The controller can output a control signal to a boiler to reduce an output of the boiler based on the temperature increment value and the temperature data to reduce overshoot of the boiler system.

10 Claims, 7 Drawing Sheets

FIG. 3

SYSTEMS AND METHODS FOR PREVENTING EXCESSIVE CASCADE BOILER SYSTEM HEATING OVERSHOOT

CROSS-REFERENCE TO RELATED APPLICATIONS

This is a divisional of U.S. patent application Ser. No. 17/073,690, filed Oct. 19, 2020, which is incorporated herein by reference.

FIELD OF TECHNOLOGY

The present disclosure relates generally to systems and methods for controlling a boiler system, and, more particularly, to systems and methods for controlling cascade boiler systems having multiple boilers of various capacities.

BACKGROUND

Boiler systems are commonly used in commercial and residential applications to heat air and/or water for a building. Some boiler systems integrate multiple boilers in a cascading arrangement to efficiently meet the varying load demand in the system. These cascade boiler systems are able to increase the overall system efficiency because they are capable of operating at lower loads while still meeting the highest demand.

Many controllers for cascade boiler systems utilize proportional integral derivative (PID) controls that are configured to control the cascading boilers based on inputs received from various sensors. In particular, many control systems are configured to control the cascading boilers based on a temperature of the water in the boiler system. For example, many control systems receive water temperature data from a temperature sensor and calculate a system response based on a difference between the current water temperature and a temperature set point. The control system, upon determining that the current water temperature is below a set point temperature, activates one or more boilers to raise the temperature of the water to the set point temperature.

Unfortunately, because there is often a delay between turning on a boiler and detecting a temperature change of the water in the boiler system, it is common for the controller to accumulate an error and continue operating one or more boilers longer than is necessary, even after the water temperature has reached the set point temperature. This can lead to the system overshooting the temperature set point and, in some cases, can cause the boiler system to shut down when a high limit temperature is reached so the boiler system does not become overheated.

To further complicate matters, some cascade boiler systems incorporate boilers having various capacities (e.g., 50K BTUH, 200K BTUH, 500K BTUH, 1M BTUH, 2M BTUH, etc.). Current cascade boiler control systems, however, are generally unable to consider the various capacities of available boilers. Therefore, when the controller determines that a boiler should be activated to increase the system water temperature, the controller may select a boiler with a greater heating capacity than is necessary, which can increase the likelihood that the system will overshoot the temperature set point.

What is needed, therefore, is a cascade boiler control system that can prevent temperature overshoot. This and other problems are addressed by the technology disclosed herein.

SUMMARY

The disclosed technology relates generally to systems and methods for controlling a boiler system, and, more particularly, to systems and methods for controlling cascade boiler systems having multiple boilers of various capacities. The disclosed technology can include a non-transitory, computer-readable medium storing instructions that, when executed by one or more processors, cause a controller associated with a boiler system to receive a threshold temperature and a maximum temperature. The controller can also receive, from a temperature sensor, temperature data indicative of a temperature of water in a boiler system. The controller can also determine, based on the temperature data, whether the temperature of the water in the boiler system is greater than or equal to the threshold temperature and determine a number of operating boilers of a plurality of boilers that were operating when the temperature of the water in the boiler system increased to equal the threshold temperature.

In response to determining that the temperature of the water in the boiler system is greater than or equal to the threshold temperature, the controller can determine a temperature increment value based on the threshold temperature, the maximum temperature, and the number of operating boilers and output a control signal to a boiler to reduce an output of the boiler based on the temperature increment value and the temperature data.

The temperature increment value can be determined by dividing a difference between the threshold temperature and the maximum temperature by the number of operating boilers. The maximum temperature can be determined by adding half of a temperature differential value to the threshold temperature. The temperature differential value can be user selectable. The temperature of the water in the boiler system can be indicative of a temperature of supply water of the boiler system. The threshold temperature can be user selectable.

The controller can also determine, based on the temperature increment value, the temperature data, and the number of operating boilers, a maximum number of boilers value and output a control signal to the boiler to reduce an output of the boiler based on the maximum number of boilers value.

The maximum number of boilers value can be determined based at least in part on the following equation:

$$\text{Max}NumBoilers = NumOperBoildersAtThresh - \left(\frac{Temp_{Supply} - Temp_{Target}}{Temp_{Increment}}\right),$$

where MaxNumBoilers represents a maximum number of boilers that should be operated, NumOperBoilersAtThresh represents the number of operating boilers of the plurality of boilers that were operating when the temperature of the water in the boiler system increased to equal the threshold temperature, $Temp_{supply}$ represents a supply water temperature of supply water, $Temp_{target}$ represents the threshold temperature, and $Temp_{increment}$ represents the temperature increment value.

The controller can also identify, based on the maximum number of boilers value, one or more boilers of the plurality of boilers to operate at 100% individual capacity. The controller can output a control signal for each of the one or more boilers to operate at 100% individual capacity and output a second control signal for each of any remaining boilers of the plurality of boilers to operate in a standby mode. The boilers can be at least one a condensing boiler and one non-condensing boiler. The boilers can also each have the same individual capacity or at least one boiler can have an individual capacity different from an individual capacity of at least one other boiler.

The controller can also determine a maximum plant rate value by dividing the maximum number of boilers value by a total number of boilers of the plurality of boilers. The controller can identify, based on the maximum plant rate value, one or more first boilers to operate at 100% individual capacity and one or more second boilers to operate at less than 100% individual capacity. The controller can output a first control signal for each of the one or more first boilers to operate at 100% individual capacity, output a second control signal for each of the one or more second boilers to operate at less than 100% individual capacity, and output a third control signal for each of any remaining boilers of the plurality of boilers to operating in a standby mode. The second number of boilers to operate at less than 100% individual capacity can be 1.

The disclosed technology can also include a non-transitory, computer-readable medium storing instructions that, when executed by one or more processors, cause a controller associated with a boiler system to receive a threshold temperature and a maximum temperature. The controller can also receive, from a temperature sensor of the boiler system, temperature data indicative of a temperature of water in the boiler system.

The controller can also receive boiler data from one or more boilers that can be indicative of an individual capacity corresponding to each boiler. The controller can determine, based on the temperature data, if the temperature of the water in the boiler system is less than or equal to the threshold temperature and output a control signal to a boiler to heat the water in the boiler system. The controller can also determine, based on the temperature data and the boiler data, a rate of temperature change of the temperature of the water in the boiler system and determine, based on the rate of temperature change, a predicted amount of time for the temperature of the water in the boiler system to reach the threshold temperature. In response to determining the predicted amount of time for the temperature of the water in the boiler system to reach the threshold temperature, the controller can output a control signal to the boiler of the plurality of boilers to control an output of the boiler.

Outputting a control signal to the boiler of the one or more boilers to control an output of the boiler can include outputting a control signal for the boiler to operate in a standby mode to prevent the boiler from providing heat to the water in the boiler system or outputting a control signal for the boiler to modulate an output of the boiler to a lower individual capacity to reduce the amount of heat the boiler is adding to the water in the boiler system.

The controller can also receive historical system data associated with the boiler system and determining the rate of temperature change of the temperature of the water in the boiler system can further based on based on the historical system data. The boilers can include at least one condensing boiler and one non-condensing boiler.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

FIG. 3 illustrates a data table depicting example data corresponding to an example method of controlling a cascade boiler system, in accordance with the disclosed technology.

DETAILED DESCRIPTION

Figure 1:
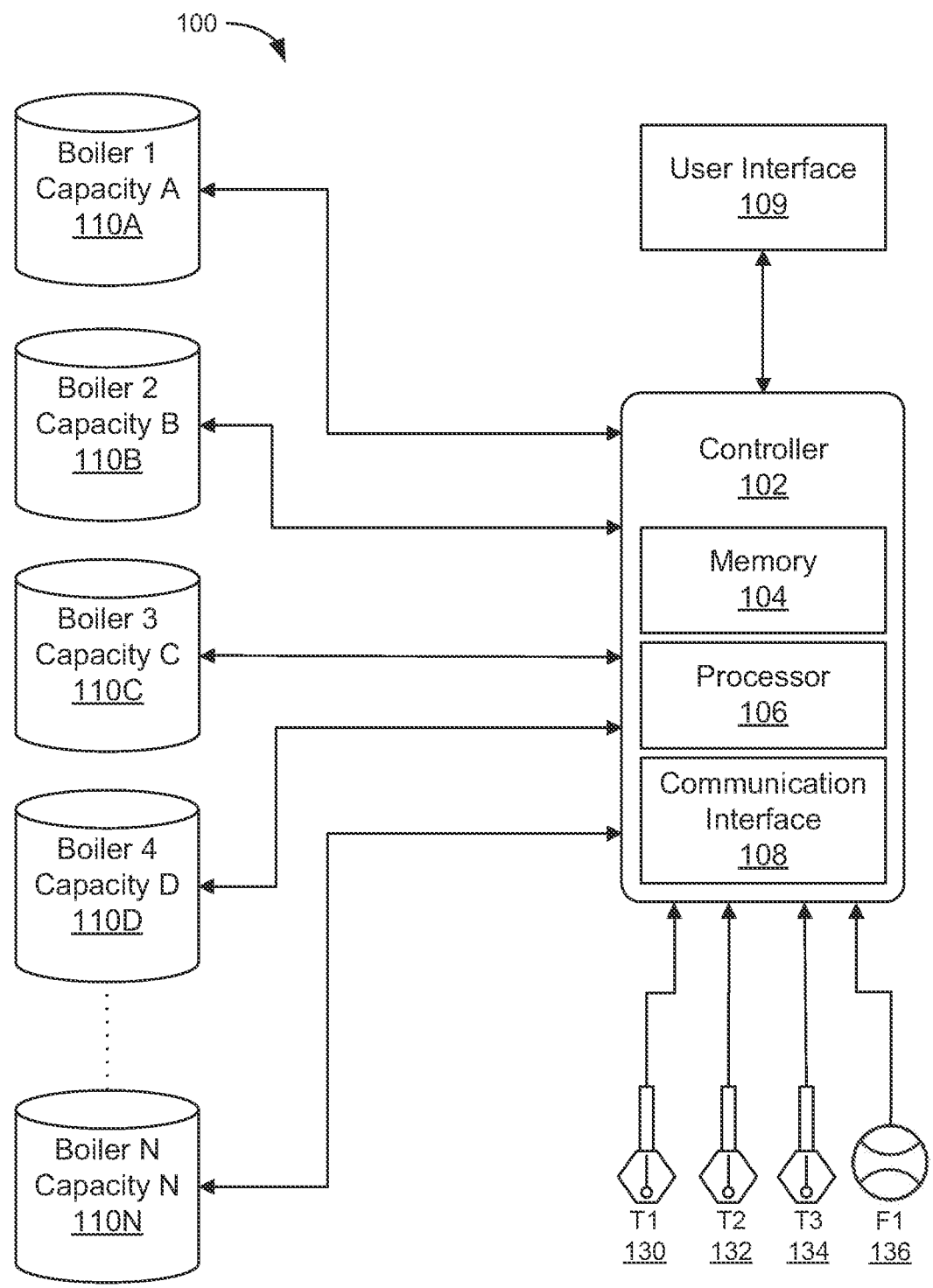
FIG. 1 illustrates an example system for controlling a cascade boiler system, in accordance with the disclosed technology.

The disclosed technology relates generally to systems and methods for intelligently controlling boiler systems. The disclosed technology can include a boiler system having multiple boilers arranged in a cascading configuration and a controller configured to determine when each boiler should be operated, which boiler should be operated, and to what output a given boiler should be operated. For example, the controller can determine which boiler or boilers should be operated (e.g., placed in a heating mode) and which boilers should not be operated (e.g., placed in a standby mode, turned off, or otherwise not in a heating mode) to prevent the boiler system from excessively overshooting a set point temperature (e.g., a target temperature, a threshold temperature, etc.). The boiler system can include both condensing and non-condensing boilers. Some or all of the boilers can have a different capacity than other boilers in the system (e.g., 50K BTUH, 200K BTUH, 500K BTUH, 1M BTUH, 2M BTUH, etc.). The controller can receive information from one, some, or all boilers to determine the type and capacity of each boiler currently in a heating mode, as well as data from one or more sensors, to determine whether to turn on additional boilers (e.g., whether to operate or otherwise place a boiler in a heating mode, etc.), turn off boilers (e.g., place in a standby mode, turn off, or otherwise not operate a boiler in a heating mode), or to reduce an output of one or more boilers to prevent excessively overshooting the water temperature set point. If the controller determines that the output of one or more boilers should be reduced, the controller can determine whether to modulate one or more boiler's output to a reduced capacity or to turn off one or more boilers. Additionally, the controller can be configured to modify the control of certain boiler(s) based on predetermined settings and/or certain circumstances. As will be made apparent throughout this disclosure, the disclosed technology can include systems and methods to operate a cascade boiler system to reach a water temperature set point without excessively overshooting the temperature set point.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of systems and methods for intelligently controlling a cascade boiler system. The cascade boiler system can include cascade boiler systems having condensing boilers, non-condensing boilers, or both. The present disclosure, however, is not so limited, and can be applicable in other contexts where intelligent control of a cascading system is desirable. The present disclosure, for example and not limitation, can include cascading heating, ventilation, and air conditioning (HVAC) systems, cascading industrial heating process systems, or other cascading systems. As another example, the disclosed technology can include heating and/or cooling systems having contributors (e.g., followers) with independent heating capacity and performance. Such implementations and applications are contemplated within the scope of the present disclosure. Accordingly, when the present disclosure is described in the context of being a control system for a cascade boiler system, it will be understood that other implementations can take the place of those referred to. Additionally, the boilers described in this disclosure are not limited by type of fuel source. For example, the boilers described in this disclosure can include boilers designed to operate using fossil fuels, biomass, renewable energy sources, or any other type of fuel that can be used to operate condensing and/or non-condensing boilers.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described.

As depicted in FIG. 1, the cascade boiler system 100 can include a controller 102 having a memory 104, a processor 106, and a communication interface 108. Optionally, the controller 102 can include or be in communication with a user interface 109. The controller 102 can be in communication with one or more boilers 110A-110N. The controller 102 can be a device separate from the boilers 110A-110N and configured to communicate with the boilers 110A-110N, and/or the controller 102 can be a controller integrated with one or more of boilers 110A-110N and configured to control all of the boilers 110A-110N. For example, the controller 102 can be a controller integrated with a boiler 110A-110N designated as a master boiler to control the other boilers 110A-110N. Furthermore, the controller 102 can be configured to communicate with any number of boilers 110A-110N (e.g., as many boilers as are installed in a given boiler system). Therefore, this disclosure should not be construed as limited to the number of boilers depicted in FIG. 1 or expressly described herein. Additionally, the controller 102 can be configured to receive data from one or more sensors, which can include, but is not limited to, a supply water temperature sensor 130, a return water temperature sensor 132, an ambient air temperature sensor 134, and/or a flow sensor 136.

As will be discussed in greater detail herein, the controller 102 can be configured to receive data from the boilers 110A-110N and the various sensors (e.g., the supply water temperature sensor 130, the return water temperature sensor 132, the ambient air temperature sensor 134, and the flow sensor 136) and, based on the received data, determine which boiler(s) should be operated to meet the current load demand without overshooting a high temperature set point (or reducing and/or minimizing the likelihood of a temperature overshoot). In other words, the controller 102 can be configured to determine how to effectively and efficiently operate the available boilers 110A-110N (e.g., the boilers in the boiler system that are currently able to operate and heat the water in the system whether currently operating or in a standby mode) to raise the temperature of the water in the system 100 to a predetermined set point by determining which of the currently-operating boilers 110A-110N should be modulated to a lower load or placed in a standby mode to ensure the water temperature does not exceed a high limit temperature and cause the system 100 to enter a safety mode or shut down.

The controller 102 can have a memory 104 and a processor 106. The controller 102 can be or include a computing device configured to receive data, determine actions based on the received data, and output a control signal instructing one or more components of the system 100 to perform one or more actions. One of skill in the art will appreciate that the controller 102 can be installed in any location, provided the controller 102 is in communication with at least some of the components of the system 100. For example, the controller 102 can be installed locally with the cascade boiler system 100 (e.g., a part or portion of the cascade boiler system 100 such as an integrated controller of a boiler of the cascade boiler system). As another example, the controller 102 can be installed at a location remote from the cascade boiler system 100 (e.g., at a remote server). Furthermore, the controller 102 can be configured to send and receive wireless or wired signals, and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller and the other components. For example, the controller 102 can have a hard-wired 24 VDC connection to the various components. Alternatively, the components can be powered directly from a power source and receive control instructions from the controller 102 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 102 can utilize a combination of wireless, hard-wired, and analog or digital communication signals to communicate with and control the various components. One of skill in the art will appreciate that the above configurations are given merely as non-limiting examples and the actual configuration can vary depending on the application.

The controller 102 can include a memory 104 that can store a program and/or instructions associated with the functions and methods described herein and can include one or more processors 106 configured to execute the program and/or instructions. The memory 104 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques described herein can be implemented as a combination of executable instructions and data within the memory.

The controller can include a communication interface 108 configured to send a receive signals to the boilers 110A-110N and the various sensors (e.g., the supply water temperature sensor 130, the return water temperature sensor 132, the ambient air temperature sensor 134, and the flow sensor 136). Communication interface 108 can include hardware, firmware, and/or software that allows the processor(s) 106 to communicate with the other components via wired or wireless networks, whether local or wide area, private or public, as known in the art. Communication interface 108 can also provide access to a cellular network, the Internet, a local area network, or another wide-area network as suitable for the particular application.

The controller 102 can be configured to communicate with a user interface 109. The user interface 109 can be configured to display system information, instructions, and the like to a user or technician. The user interface 109 can be integrated into a housing with the controller 102, installed remotely from the controller 102 and be in wired or wireless communication with the controller 102, or the user interface 109 can be a remote device (e.g., a user's mobile device or other hand held device) that is in communication with the controller 102 (e.g., directly, via one or more networks). Information displayed by the user interface 109 can include information about current system 100 data such as information detailing which boiler(s) 110A-110N is/are operating, at what capacity the boiler(s) 110A-110N is/are currently operating, one or more system temperatures, one or more flow rates, one or more pressures, historical use data, one or more maintenance schedules, which loads within the building are currently using the most heat, and/or the current settings of the cascade boiler system 100. The user interface 109 can also be configured to receive inputs from a user. For example, a user can select settings or provide other input such that the user can configure the cascade boiler system 100 to operate and respond to load demands as desired. As an example, this can enable a user to change settings on the controller 102 to respond to load demands quickly or to respond to load demands in a more cost-efficient manner.

The boilers 110A-110N can be or include any type of boiler, including condensing boilers and/or non-condensing boilers. Furthermore, the boilers 110A-110N can be any capacity of boiler as would be suitable for the particular application, including boilers each having the same capacity or boilers each having different capacities. For example, the boilers 110A-110N can have capacities ranging from less than 10K BTUH to capacities of greater than 2M BTUH. As will be appreciated, the controller 102 can be configured to control boilers of any capacity.

The boilers 110A-110N can be configured to communicate with the controller 102. For example, the boilers 110A-110N can send data to the controller 102 and receive control signals from the controller 102 to effectively control the boilers 110A-110N. As non-limiting examples, the data can relate to one or more of: which boiler(s) is/are available, the type(s) of boiler available, the capacities of boiler available, a current operating status for the system 100 and/or one or more individual boilers, historical operating status for the system 100 and/or one or more individual boilers (e.g., how long the boiler has been in service, how long a boiler's operating performance has changed over time) (which can help indicate updated information regarding a current efficiency of a given boiler), one or more predetermined maintenance schedules, and boiler operational data indicating current boiler conditions (e.g., temperatures and/or pressures at one or more locations in the boiler or system 100, flue gas chemical composition, etc.).

The temperature sensors (e.g., the supply water temperature sensor 130, the return water temperature sensor 132, the ambient air temperature sensor 134) can be or include any type of sensor suitable for the particular application. For example, the temperature sensors 130, 132, 134 can be or include a thermocouple, a resistance temperature detector (RTD), a thermistor, an infrared sensor, a semiconductor, or any other suitable type of sensor. Furthermore, the supply water temperature sensor 130 can be installed at any location where the supply water temperature sensor 130 is capable of detecting a temperature of the supply water. Similarly, the return water temperature sensor 132 can be installed in any location where the return water temperature sensor 130 is capable of detecting a temperature of the return water. The ambient air temperature sensor 134 can similarly be installed in any location where the ambient air temperature sensor 134 is capable of detecting a temperature of the ambient air.

The flow sensor 136 can be installed in any suitable location in the system 100 to detect a flow rate of the fluid in the system 100 at the installed location and transmit the detected flow data to the controller 102. The flow sensor 136 can be any type of flow sensor, and the flow sensor 136 can be configured to simply detect fluid flow (i.e., whether the fluid is flowing or not) or can detect a rate of flow of the fluid. If the flow sensor 136 simply measures the presence of fluid flow, the flow sensor 136 can be a flow switch. If the flow sensor 136 is a flow switch, it can be a vane actuated flow switch, a disc actuated flow switch, a liquid flow switch, or any other appropriate type of flow switch for the application. If the flow sensor 136 measures the rate of fluid flow, the flow sensor 136 can be a flow meter or another type of rate-measuring flow sensor. For example, the flow sensor 136 can be a differential pressure flow meter, a positive displacement flow meter, a velocity flow meter, a mass flow meter, an open channel flow meter, or any other type of flow meter configured to measure flow rate of a fluid.

Figure 2:
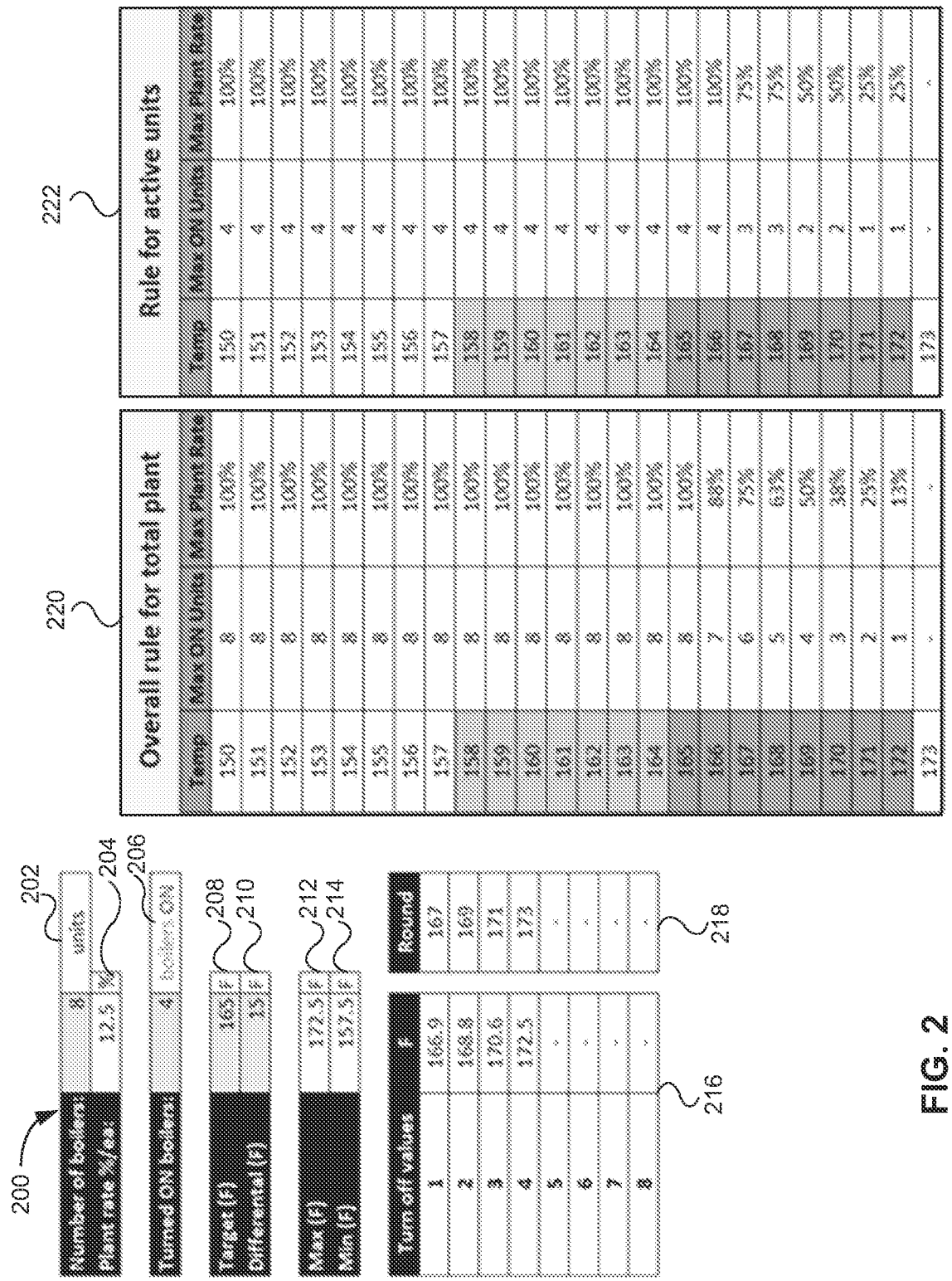
FIG. 2 illustrates a data table depicting example data corresponding to an example method of controlling a cascade boiler system, in accordance with the disclosed technology.

FIG. 2 illustrates a data table depicting data corresponding to an example display or user interface 200 for controlling a cascade boiler system 100, in accordance with the disclosed technology. The values depicted in FIG. 2 can represent values inputted by the user or values calculated by the controller 102 as described in greater detail herein. Furthermore, the display or user interface 200 depicted in FIG. 2 is offered merely for illustrative purposes and the actual configuration can vary depending on the particular application.

The user interface 200 depicted in FIG. 2 can correspond to a boiler system 100 comprising boilers 110A-110N each being the same capacity and each being operated at full load (e.g., the boilers 110A-110N can either operate at 100% capacity or be placed in a standby mode). The data depicted in the data table can correspond to a method of controlling the boiler system 100 to ensure the boilers 110A-110N can maintain the temperature of the boiler system 100 based on a target temperature without causing excessive overshoot. In other words, the controller 102 can be configured to determine a difference (or error) between a current system temperature and a target temperature 208 (e.g., a set point temperature, a threshold temperature, etc.). As will be described in greater detail herein, the controller 102 can determine a difference between the current system temperature and a target temperature 208 and consider the impact each boiler 110A-110N has on the system temperature when or if operated to ensure boiler system 100 does not overshoot a maximum temperature 212. Accordingly, the controller 102, considering the impact of each individual boiler 110A-110N, can operate one or more boilers 110A-110N to raise the system temperature without causing system overshoot.

The boiler system 100 can include a number of boilers 202 that can be varied depending on the particular application. For example, the boiler system 100 can include one, two, three, four, eight, twelve, sixteen, twenty-four, or more or fewer boilers 110A-110N depending on the specific application. In the specific example depicted in FIG. 2, the boiler system 100 can include eight total boilers. Because each boiler in this example has the same capacity in this example, each boiler is capable of producing 12.5% of the overall total boiler system output (as depicted at 204). Furthermore, as will be appreciated, the controller 102 can be configured to operate some or all boilers 110A-110N simultaneously to meet the load demand. In the specific example depicted in FIG. 2, the number of boilers 110A-110N currently operating can be displayed (shown at 206 as four boilers currently operating). As an example, the target temperature 208 (e.g., a set point temperature or threshold temperature) can be 165° F. and the differential temperature 210 can be 15° F. The differential temperature 210 can correspond to a predetermined range of satisfactory temperature values for the boiler system 100. For example, with the target temperature 208 being 165° F. and the differential temperature 210 being 15° F., the boiler system 100 can be configured to operate with satisfactory temperatures up to 7.5° F. greater than the target temperature (i.e., the maximum temperature 212 can be 172.5° F.) and satisfactory temperatures up to 7.5° F. less than the target temperature 208 (i.e., the minimum temperature 214 can be 157.5° F.). As will be appreciated, the target temperature 208, the differential temperature 210, and/or the maximum temperature 212 and the minimum temperature 214 can each be user selectable or preprogrammed. The boiler system 100 can be configured to begin turning on one or more boilers 110A-110N (e.g., operated or placed in a heating mode, etc.) to meet a load demand when the system temperature falls to the minimum temperature 214 and turn off (e.g., shutdown or placed in a standby mode) all boilers 110A-110N when the system temperature rises to the maximum temperature 212.

The method can include determining one or more turn off temperature values 216 where one or more boilers can begin to be placed in a standby mode to ensure the temperature in the system 100 doesn't overshoot a high limit temperature value (either the maximum temperature 212 or a particular temperature value greater than the maximum temperature value 212). The turn off temperature values 216 can be calculated by determining turn off temperature increment values and adding the turn off temperature increment values to the target temperature 208. The turnoff temperature increment values can be calculated by dividing the differential temperature 210 in half (e.g., 15° F./2) and dividing the resulting value by the number of boilers 110A-110N currently operating (e.g., the number of currently operating boilers is 4 in this example as depicted at 206). In other words, the turn off temperatures 216 can be determined by increment values calculated according to the following equation:

$$Temp_{Increment} = \frac{DIFF/2}{NumOperBoilersAtThresh} \quad (1)$$

where DIFF is equal to the differential temperature 210 and NumOperBoilersAtThresh corresponds to the number of boilers 110A-110N that are or were presently operating when the system temperature reached the target temperature 208. Accordingly, Equation 1 provides a solution for determining when (e.g., at what temperature(s)) to disable or turn off currently operating boilers 110A-110N to help ensure the temperature does not overshoot past the maximum temperature 212.

In the example shown in FIG. 2, table 222 depicts four boilers 110A-110N can be operated to raise the temperature of the water. Table 222 also depicts four boilers as operating when the water temperature reached 165° F., which is the target temperature 208. Solving Equation 1 with DIFF=15 (differential temperature 210) and NumOperBoilersAtThresh=4 results in a $Temp_{Increment}=1.875$ or a rounded value of 2, which is reflected in table 222. As illustrated in table 222, with all 4 boilers operating when the water temperature reaches the target temperature 208, the first boiler can be placed in a standby mode at approximately 166.9° F., the second boiler can be placed in a standby mode at approximately 168.8° F., the third boiler can be placed in a standby mode at 170.6° F., and the fourth boiler can be placed in a standby mode at 172.5° F. (or the maximum temperature 212). As will be appreciated, the actual values where the boilers 110A-110N begin to be placed in a standby mode can be rounded to the nearest whole number as depicted in the "Round" column 218. For example, the first boiler can be placed in a standby mode at 167° F., the second boiler can be placed in a standby mode at 169° F., the third boiler can be placed in a standby mode at 171° F., and the fourth boiler can be placed in a standby mode at 173° F.

As can be seen from Equation 1, the turn off temperature values 216 depend on the differential temperature 210 and the number of boilers that are operating when the water temperature has increased to equal the target temperature 208. Thus, assuming the differential temperature 210 is 15° F., the temperature increment value would be 0.94° F. if there were eight boilers operating (i.e., half the differential temperature (7.5° F.) divided by 8 boilers) when the water temperature was increased to equal the target temperature 208. Similarly, the temperature increment value would be 1.25° F. if there were six boilers operating (i.e., half the differential temperature (7.5° F.) divided by 6 boilers) when the water temperature was increased to equal the target temperature 208. Likewise, the temperature increment value would be 1.875° F. if there were four boilers operating (i.e., half the differential temperature (7.5° F.) divided by 4 boilers) when the temperature was increased to equal the target temperature 208 (this example is reflected in the turnoff values 216 depicted in FIG. 2. As will be appreciated, similar temperature increment calculations can be made for various numbers of operating boilers and various differential temperature values.

As an overall solution for the system 100 to determine the number of boilers that should be operated when the water temperature reaches the target temperature 208 to meet the load demand without causing overshoot (MaxNumBoilers), the system 100 can control the boilers 110A-110N according to the following equation:

$$\text{Max}NumBoilers = NumOperBoilersAtThresh - \left(\frac{Temp_{Supply} - Temp_{Target}}{Temp_{Increment}}\right) \quad (2)$$

where $Temp_{supply}$ corresponds to the current temperature of the water in the system 100 and $Temp_{Target}$ corresponds to the target temperature 208.

Figure 3:
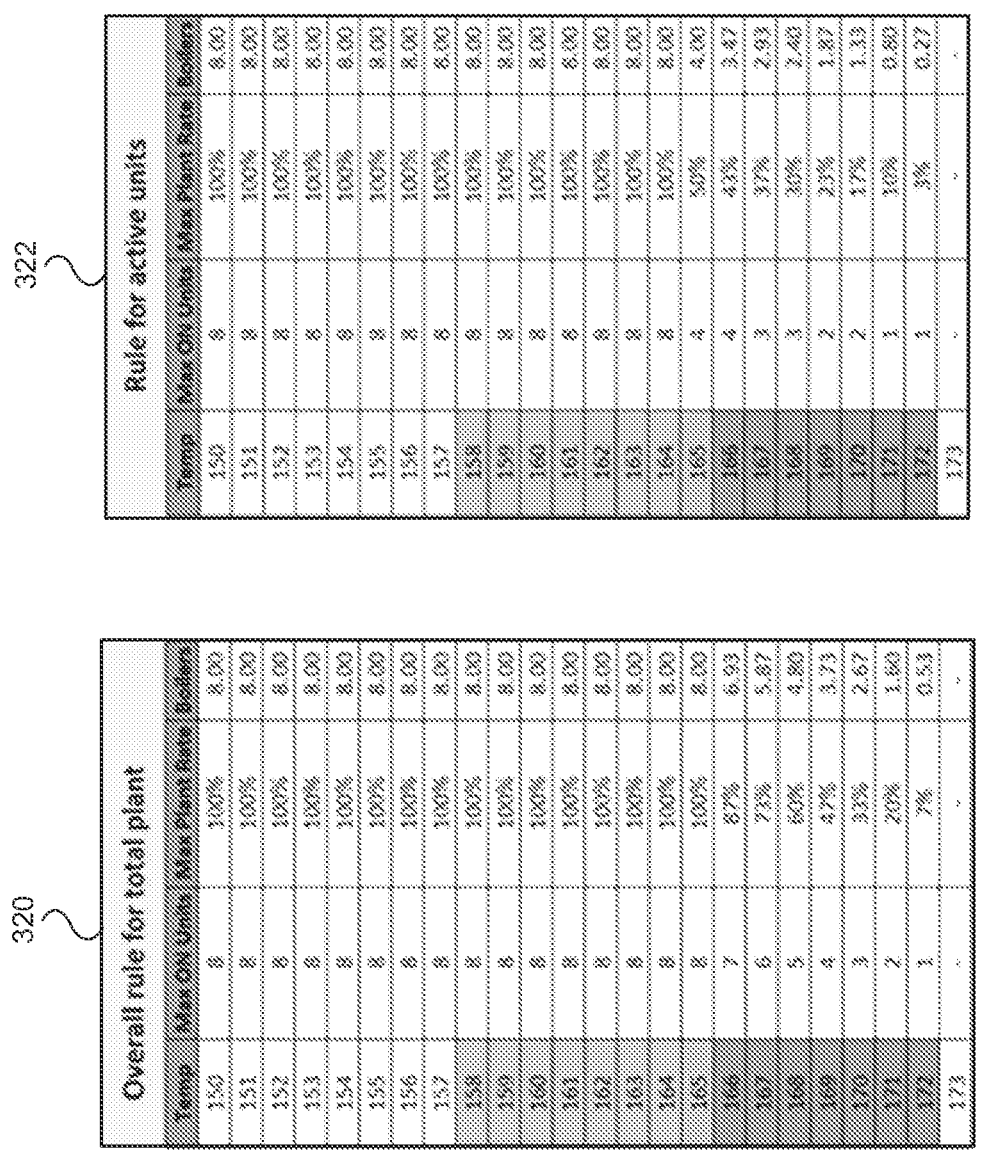

In systems where the boilers 110A-110N are capable of being modulated to lower outputs, the controller 102 can also be configured to more precisely control the boilers 110A-110N based on an overall output of the boiler system 100. By modulating one or more boilers 110A-110N, the controller 102 can further control the boilers 110A-110N to cause the system temperature to reach the target temperature without causing excessive temperature overshoot in the system 100. For example, as depicted by the data table of user interface 200 in FIG. 3, using the same values 202-218 described in relation to FIG. 2, the controller 102 can be configured to control the boilers 110A-110N to achieve an overall system output between 0% and 100% by modulating one or more boilers 110A-110N to an output that is less than or equal to 100% of the output of the individual boiler. The controller 102 can be configured to control a number of boilers to each operate at 100% of their respective individual capacities until the target temperature 208 is reached. For example, as depicted in the overall rule for total plant table 320, the controller 102 can be configured to control all available boilers at 100% capacity until the target temperature 208 is reached. Once the target temperature 208 is reached, the controller 102 can be configured to operate fewer boilers 110A-110N (e.g., incrementally), such as, for example, according to the results of a determination based on Equation 2, as discussed above with respect to FIG. 2. Unlike the example discussed in relation to FIG. 2, however, the controller 102 can be configured to control the overall boiler system 100 output by modulating at least one boiler 110A-110N to an output that is less than 100% of the boiler's 110A-110N maximum output.

The controller 102 can determine the necessary capacity of the boiler 110A-110N that is to be modulated by determining the overall maximum plant rate necessary to meet the load demand without causing overshoot. For example, the maximum plant rate can be calculated based on the following equation:

$$\text{Max}PlantRate = \frac{\text{Max}NumBoilers}{NumTotalPlantSize} \quad (3)$$

where MaxPlantRate equals the total capacity needed to meet the current load demand and NumTotalPlantSize is the total number of boilers 110A-110N available for control in the boiler system 100. This equation will return a value corresponding to the values included in the far-right column of tables 320 and 322. Once the overall maximum plant rate is determined, the controller 102 can determine a number of boilers 110A-110N that should be operated at 100% capacity and another boiler 110A-110N that should be modulated to a reduced capacity to meet the maximum plant rate. Thus, the decimal value of the values included in the far-right column of tables 320 and 322 corresponds to a percentage of boiler 110A-110N needed to meet the current load demand without causing excessive overshoot.

As a specific example, and as depicted in the overall rule for total plant table 320, at a supply temperature of 166° F., the controller 102 can operate seven total boilers with a max plant rate of 87% by operating six boilers 110A-110N at 100% of their respective individual capacities and one boiler 110A-110N at 93% of its individual capacity. This is reflected in the far-right column of table 320 by the value 6.93, in which the integer "6" indicates six boilers operating at 100% of their respective individual capacities and the decimal 0.93 indicates a single boiler operating at 93% of its individual capacity. As the supply temperature continues to rise, the controller 102 can systematically modulate the overall boiler system 100 output based at least in part on the supply temperature. Continuing the previous example, at a supply temperature of 167° F., the controller 102 can modulate the total boiler system 100 to include six total boilers operating at a maximum plant rate of 73% by operating five boilers 110A-110N at 100% of their respective individual capacities and one boiler 110A-110N at 87% of its individual capacity (represented by the boiler value of 5.87 in the far-right column and as described above). At a supply temperature of 168° F., the controller 102 can modulate the total boiler system 100 to include five total boilers operating at a max plant rate of 60% by operating four boilers 110A-110N at 100% of their respective individual capacities and one boiler 110A-110N at 80% of its individual capacity (represented by the boiler value of 4.80 in the far-right column). At a supply temperature of 169° F., the controller 102 can modulate the total boiler system 100 to include four total boilers operating at a maximum plant rate of 47% by operating three boilers 110A-110N at 100% of their individual capacities and one boiler 110A-110N at 73% of its individual capacity (represented by the boiler value 3.73 in the far-right column). At a supply temperature of 170° F., the controller 102 can modulate the total boiler system 100 to include three total boilers operating at a maximum plant rate of 33% by operating two boilers 110A-110N at 100% of their individual capacities and one boiler 110A-110N at 67% capacity of its individual capacity (represented by the boiler value 2.67 in the far-right column). At a supply temperature of 171° F., the controller 102 can modulate the total boiler system 100 to include two total boilers operating at a maximum plant rate of 20% capacity by operating one boiler 110A-110N at 100% of its individual capacity and one boiler 110A-110N at 60% of its individual capacity (represented by the boiler value 1.60 in the far-right column). At a supply temperature of 172° F., the controller 102 can modulate the total boiler system 100 to include one boiler operating at a maximum plant rate of 7% capacity by operating the one boiler 110A-110N at 53% of its individual capacity (represented by the boiler value 0.53 in the far-right column). Finally, at a supply temperature of 173° F., all boilers 110A-110N can be placed in a standby mode such that zero boilers are operating and the max plant rate is zero.

As another example, and as depicted in table 322, the controller 102 can be configured to control all available boilers 110A-110N at 100% capacity (eight boilers in this example) until the supply temperature reaches the target temperature 208 of 165° F., at which point the controller 102 can be configured to reduce the max plant rate to 50% capacity by placing four boilers 110A-110N in standby mode and continuing to operate the other four boilers 110A-110N at 100% capacity. In other examples, the controller 102 can continue to operate all boilers 110A-110N that were operating at the time the supply temperature reached the target temperature 208 no matter the number of boilers 110A-110N that were operating at the time. As the supply temperature continues to rise, the controller 102 can continue to control the boilers 110A-110N to achieve a suitable overall boiler system 100 output corresponding to the current supply temperature. For example, at a supply temperature of 166° F., the controller 102 can modulate the total boiler system 100 to include four total boilers operating at a maximum plant rate of 43% capacity by operating three boilers 110A-110N at 100% of their individual capacities and one boiler 110A-110N at 47% of its individual capacity (represented by the boiler value 3.47 in the far-right column).

At a supply temperature of 167° F., the controller 102 can modulate the total boiler system 100 to include three total boilers operating at a maximum plant rate of 30% capacity by operating two boilers 110A-110N at 100% of their individual capacities and one boiler 110A-110N at 93% of its individual capacity (represented by the boiler value 2.93 in the far-right column). At a supply temperature of 168° F., the controller 102 can modulate the total boiler system 100 to include three total boilers operating at a maximum plant rate of 30% capacity by operating two boilers 110A-110N at 100% of their individual capacities and one boiler 110A-110N at 40% of its individual capacity (represented by the boiler value 2.40 in the far-right column). At a supply temperature of 169° F., the controller 102 can modulate the total boiler system 100 to include two total boilers operating at a maximum plant rate of 23% capacity by operating one boiler 110A-110N at 100% of its individual capacity and one boiler 110A-110N at 87% of its individual capacity (represented by the boiler value 1.87 in the far-right column). At a supply temperature of 170° F., the controller 102 can modulate the total boiler system 100 to include two total boilers operating at a maximum plant rate of 17% capacity by operating one boiler 110A-110N at 100% of its individual capacity and one boiler 110A-110N at 33% of its individual capacity (represented by the boiler value 1.33 in the far-right column). At a supply temperature of 171° F., the controller 102 can modulate the total boiler system 100 to include one total boiler operating at a maximum plant rate of 10% capacity by operating the one boiler 110A-110N at 80% of its individual capacity (represented by the boiler value 0.8 in the far-right column). At a supply temperature of 172° F., the controller 102 can modulate the total boiler system 100 to include one total boiler operating at a maximum plant rate of 3% capacity by operating the one boiler 110A-110N at 27% of its individual capacity (represented by the boiler value 0.27 in the far-right column). Finally, at a supply temperature of 173° F., all boilers 110A-110N can be placed in a standby mode such that zero boilers are operating and the max plant rate is zero.

Figure 4:
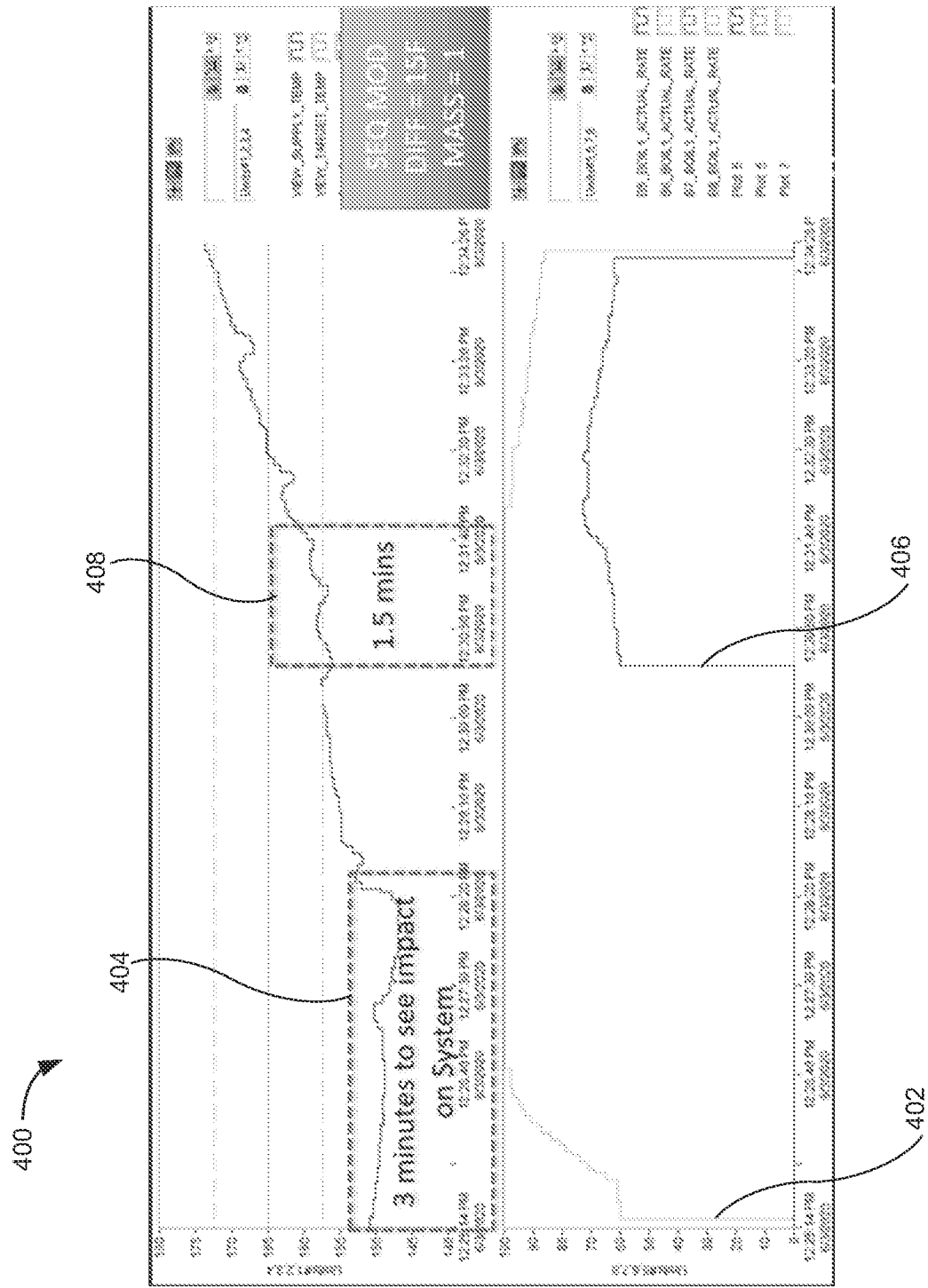
FIG. 4 illustrates historical temperature and operational data of a boiler system, in accordance with the disclosed technology.

Alternatively or additionally, as depicted in FIG. 4, the controller 102 can be configured to determine an amount of time expected for a given number of operating boilers 110A-110N to cause the temperature of the water in the system to rise to the target temperature (or set point temperature) and proactively prevent additional boilers 110A-110N from operating. In other words, the controller 102 can proactively reduce the load of a currently operating boiler 110A-110N if, based on the determined amount of time for the system temperature to reach the target temperature 208, it is likely that operating an additional boiler or continuing to operate the boilers 110A-110N at 100% capacity would cause system overshoot. To make this determination, the controller 102 can analyze historical system data 400 and compare it to the number of operating boilers 110A-110N, the current system temperature, and the target temperature 208 and extrapolate an expected amount of time it would take to detect a change in the rate at which the system temperature is increasing based on the number of boilers 110A-110N currently operating and the individual capacity of the boilers 110A-110N currently operating. By determining the amount of time it would take to detect a change in the rate at which the system temperature is increasing, the controller 102 can predict how quickly the system temperature would rise after turning on a boiler 110A-110N because the rate at which the system temperature rises will increase with each additional boiler 110A-110N operated.

As an example, the controller 102 can analyze historical system data 400 to determine that it can take approximately three minutes 404 to detect a change in the rate of temperature increase of the water in the boiler system 100 after turning on 402 a single boiler 110A-110N with no other boilers 110A-110N operating based on the historical system data 400. The controller 102 can determine that it can take approximately one and a half minutes 408 to detect a change in the rate of temperature increase of the water in the boiler system 100 after turning on 406 a second boiler 110A-110N Similarly, the controller 102 can determine that it would take approximately forty-five seconds to detect a change in the rate of temperature increase of the water in the boiler system 100 after turning on a third boiler 110A-110N (not shown). Similar calculations can be made depending on the number of operating boilers 110A-110N. Thus, the controller 102 can calculate, based on the historical data and the number of operating boilers 110A-110N, an expected time that it would take after turning on an additional boiler 110A-110N for the temperature of the water in the system to reach the target temperature 208. If the controller 102 determines that, based on the calculated expected time, operating an additional boiler 110A-110N or continuing to operate the boilers 110A-110N at 100% capacity would likely cause system overshoot, the controller 102 can determine that an additional boiler 110A-110N should not be operated or that one or more boilers 110A-110N should be modulated to a lower capacity. In this way, the controller 102 can proactively control the boilers 110A-110N to prevent excessive system overshoot.

Optionally, the controller 102 can determine the amount of time it would take to detect a change in the rate at which the system temperature is increasing based on the current system temperature and an individual capacity of a boiler 110A-110N without considering historical system data 400. For example, the controller 102 can be configured to determine how quickly a change in the rate at which the system temperature is increasing will be detected by considering the current system temperature, the individual boiler's 110A-110N capacity, and system parameters such as the size of the boiler system 100, a flow rate of the water through the boiler system 100, a present load on the boiler system 100, or other suitable parameters for the application.

Each of the examples described herein can be further implemented in boiler systems 100 having various boiler capacities and boiler types. For example, the boiler system 100 can have boilers 110A-110N having varying capacities and comprising both condensing boilers and non-condensing boilers. The controller 102 can be configured to receive data corresponding to each boiler 110A-110N (e.g., receive data from each boiler) such that the controller 102 can determine the type and capacity of each boiler 110A-110N in the system. The controller 102 can calculate a total plant output for the currently operating boilers 110A-110N (e.g., by aggregating the individual max capacity of each individual boiler) and determine if any of the available boilers 110A-110N (the remaining boilers 110A-110N currently in standby mode) can be operated without causing system overshoot.

For example, the controller 102 can be configured to control a boiler system 100 having boilers 110A-110N with capacities of 300 k BTU, 1M BTU, and 2M BTU. In this example, the controller 102 can determine a BTU output (capacity) of each individual boiler 110A-110N as the boiler 110A-110N is modulated between 0% capacity and 100% capacity. For example, the controller 102 can determine the capacities of each boiler 110A-110N in the system according to the following table:

|  | 10% | 25% | 50% | 75% | 100% |
|---|---|---|---|---|---|
| Boiler#1 | 30,000 | 75,000 | 150,000 | 225,000 | 300,000 |
| Boiler#2 | 100,000 | 250,000 | 500,000 | 750,000 | 1,000,000 |
| Boiler#3 | 200,000 | 500,000 | 1,000,000 | 1,500,000 | 2,000,000 | where the percentage values correspond to a modulated rate of the boiler 110A-110N and the values below the percentage values correspond to the boiler's 110A-110N output with the given modulated capacity (e.g., Boiler #1 is capable of outputting 30 k BTU when modulated down to 10% output and 300 k BTU when modulated to 100% output, etc.). The controller 102 can then determine which boiler 110A-110N to output a control signal to based on the current load demand and the maximum plant rate equation previously described. In contrast to the previous examples, however, the controller 102 can further determine that multiple boilers 110A-110N should be modulated to a load less than 100% of the capacity of the boiler 110A-110N to meet the maximum plant rate. For example, if the controller 102 calculates a maximum plant rate of 2.5, the controller 102 can determine that it should output a control signal to operate two boilers at 100% capacity and modulate a third to a reduced capacity or the controller 102 can determine that all three boilers 110A-110N should be modulated to a reduced capacity to meet the maximum plant rate. The controller 102 can determine which boiler 110A-110N should be modulated to a lower capacity based, for example, on a rotation schedule to reduce individual boiler wear or based on the individual efficiency of each boiler 110A-110N at given output rates.

As will be appreciated, the examples described herein can cause the boiler system 100 to raise the temperature of the water to the target temperature 208 without causing excessive overshoot by reducing the overall system output as the water temperature reaches the target temperature 208. In other words, unlike existing systems, the disclosed technology does not continue to operate all boilers called upon to raise the temperature of the water until the maximum temperature 212 is reached. By outputting a control signal to the boilers 110A-110N to instruct the boilers to transition to a standby mode or to modulate the capacity to a reduced load (i.e., modulate a given boiler to less than 100% of the boiler's individual maximum capacity) as the target temperature 208 is reached and exceeded, the controller 102 can prevent excessive overshoot of the system. Furthermore, the examples just described are offered merely for illustrative purposes and the actual control and output of the boiler system 100 can be configured for the particular design. For example, the boiler system 100 can be varied by number of boilers, boiler output, system demand, and other various system parameters that can affect the performance of the boilers 110A-110N. Thus, one of skill in the art will understand that the disclosed technology can be modified for the particular application to ensure excessive system overshoot is prevented.

Figure 5:
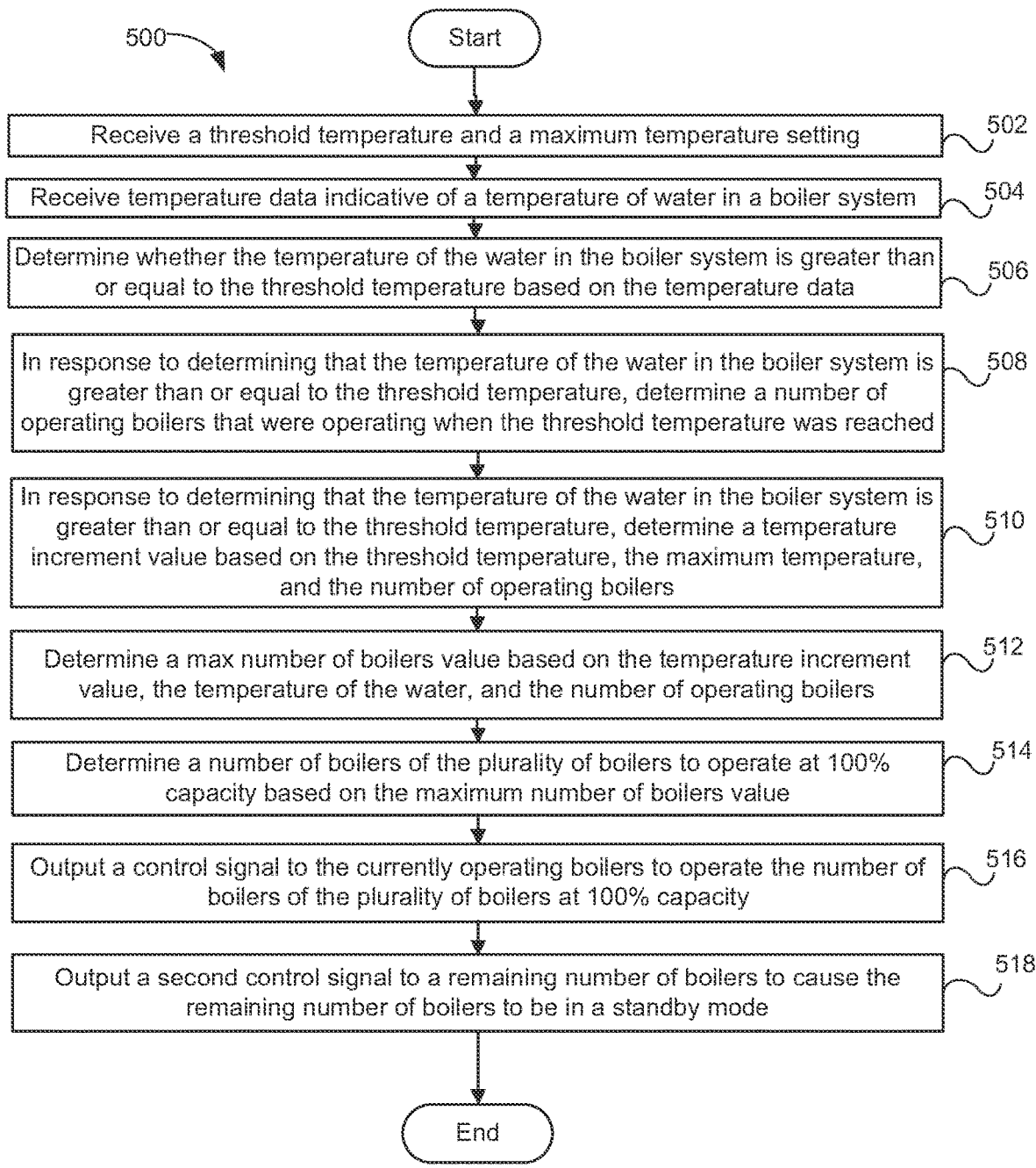
FIG. 5 illustrates a flowchart of an example method of controlling a cascade boiler system, in accordance with the disclosed technology.

FIG. 5 is a flowchart of a method 500 of operating a cascade boiler system according to the disclosed technology. The method 500 can include receiving 502 a threshold temperature and a maximum temperature setting. The maximum temperature setting can be based on, for example, the threshold temperature and a temperature differential setting (e.g., the maximum temperature can be half the temperature differential added to the threshold temperature). The method 500 can include receiving 504 temperature data indicative of a temperature of water in a boiler system. The method 500 can include determining 506 whether the temperature of the water in the boiler system is greater than or equal to the threshold temperature based on the temperature data. In response to determining 506 that the temperature of the water in the boiler system is greater than or equal to the threshold temperature, the method 500 can include determining 508 a number of operating boilers that were operating when the threshold temperature was reached. In response to determining 508 that the temperature of the water in the boiler system is greater than or equal to the threshold temperature, the method 500 can include determining 510a temperature increment value based on the threshold temperature, the maximum temperature, and the number of operating boilers (e.g., as described herein with respect to Equation 1).

The method 500 can include determining 512 a maximum number of boilers value based on the temperature increment value, the temperature data, and the number of operating boilers (e.g., as described herein with respect to Equation 2). The method 500 can include determining 514 a number of boilers of the plurality of boilers to operate at 100% individual capacity based on the maximum number of boilers value and outputting 516 a control signal to the currently operating boilers to operate the number of boilers of the plurality of boilers at 100% individual capacity and outputting 518 a second control signal to a remaining number of boilers to cause the remaining number of boilers to be in a standby mode.

Figure 6:
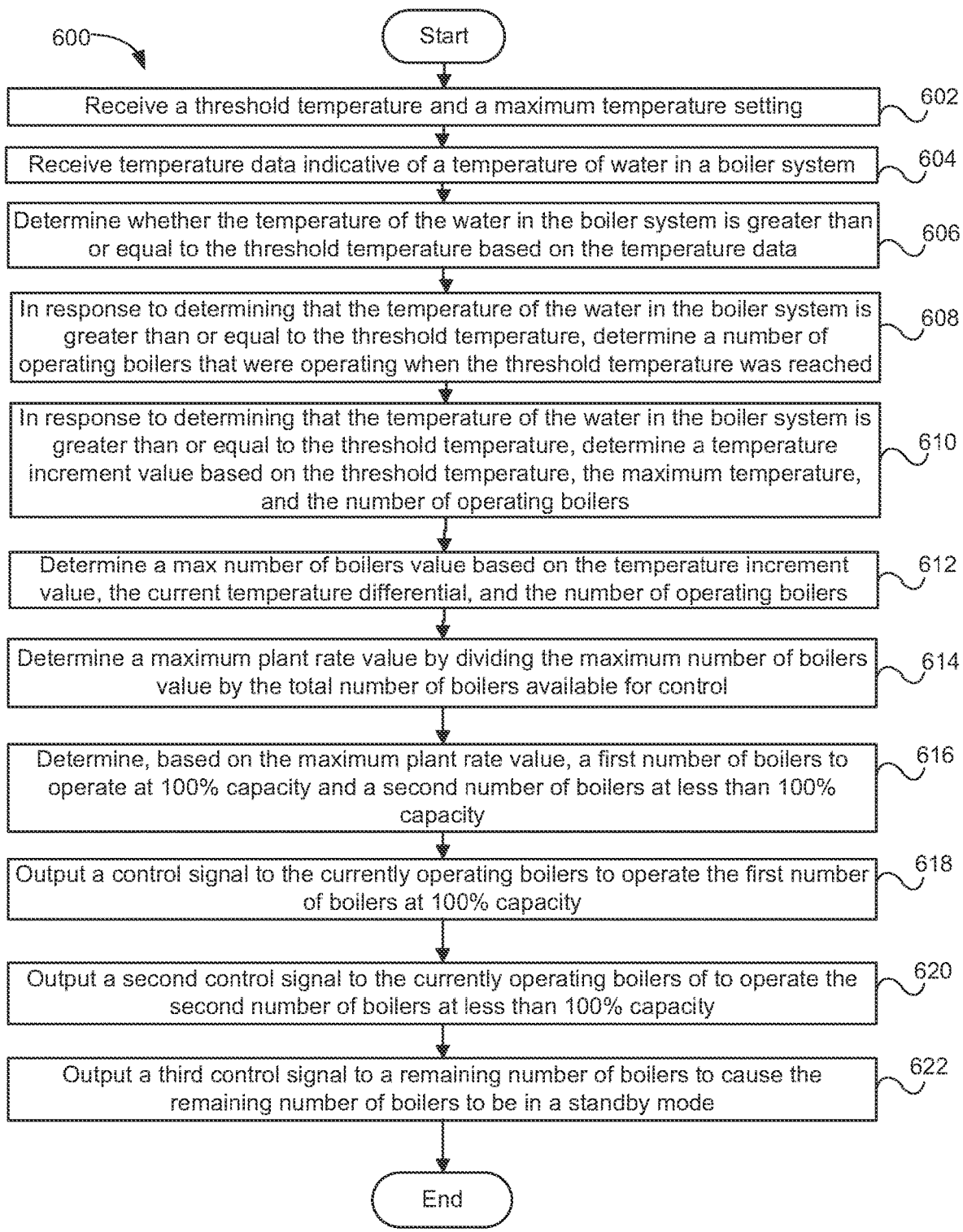
FIG. 6 illustrates a flowchart of an example method of controlling a cascade boiler system, in accordance with the disclosed technology.

As another example, FIG. 6 depicts another method 600 of operating a cascade boiler system according to the disclosed technology. Similar to method 500, method 600 can include receiving 602 a threshold temperature and a maximum temperature setting. The maximum temperature setting can be based on, for example, the threshold temperature and a differential temperature setting (e.g., the maximum temperature can be half the temperature differential added to the threshold temperature). The method 600 can include receiving 604 temperature data indicative of a temperature of water in a boiler system. The method 600 can include determining 606 whether the temperature of the water in the boiler system is greater than or equal to the threshold temperature based on the temperature data. In response to determining 606 that the temperature of the water in the boiler system is greater than or equal to the threshold temperature, the method 600 can include determining 608 a number of operating boilers that were operating when the threshold temperature was reached. In response to determining 608 that the temperature of the water in the boiler system is greater than or equal to the threshold temperature, the method 600 can include determining 610 a temperature increment value based on the threshold temperature, the maximum temperature, and the number of operating boilers (e.g., as described herein with respect to Equation 1) and determining 612a maximum number of boilers value based on the temperature increment value, the temperature data, and the number of operating boilers (e.g., as described herein with respect to Equation 2).

The method 600 can include determining 614 a maximum plant rate value by dividing the maximum number of boilers value by the total number of boilers available for control (e.g., as described herein with respect to Equation 3). The method 600 can include determining 616, based on the maximum plant rate value, a first number of boilers to operate at 100% capacity and a second number of boilers at less than 100% capacity. The method 600 can include outputting 618 a control signal to the currently operating boilers to operate the first number of boilers at 100% capacity, outputting 620 a second control signal to the currently operating boilers of to operate the second number of boilers at less than 100% capacity, and/or outputting 622 a third control signal to a remaining number of boilers to cause the remaining number of boilers to be in a standby mode.

Figure 7:
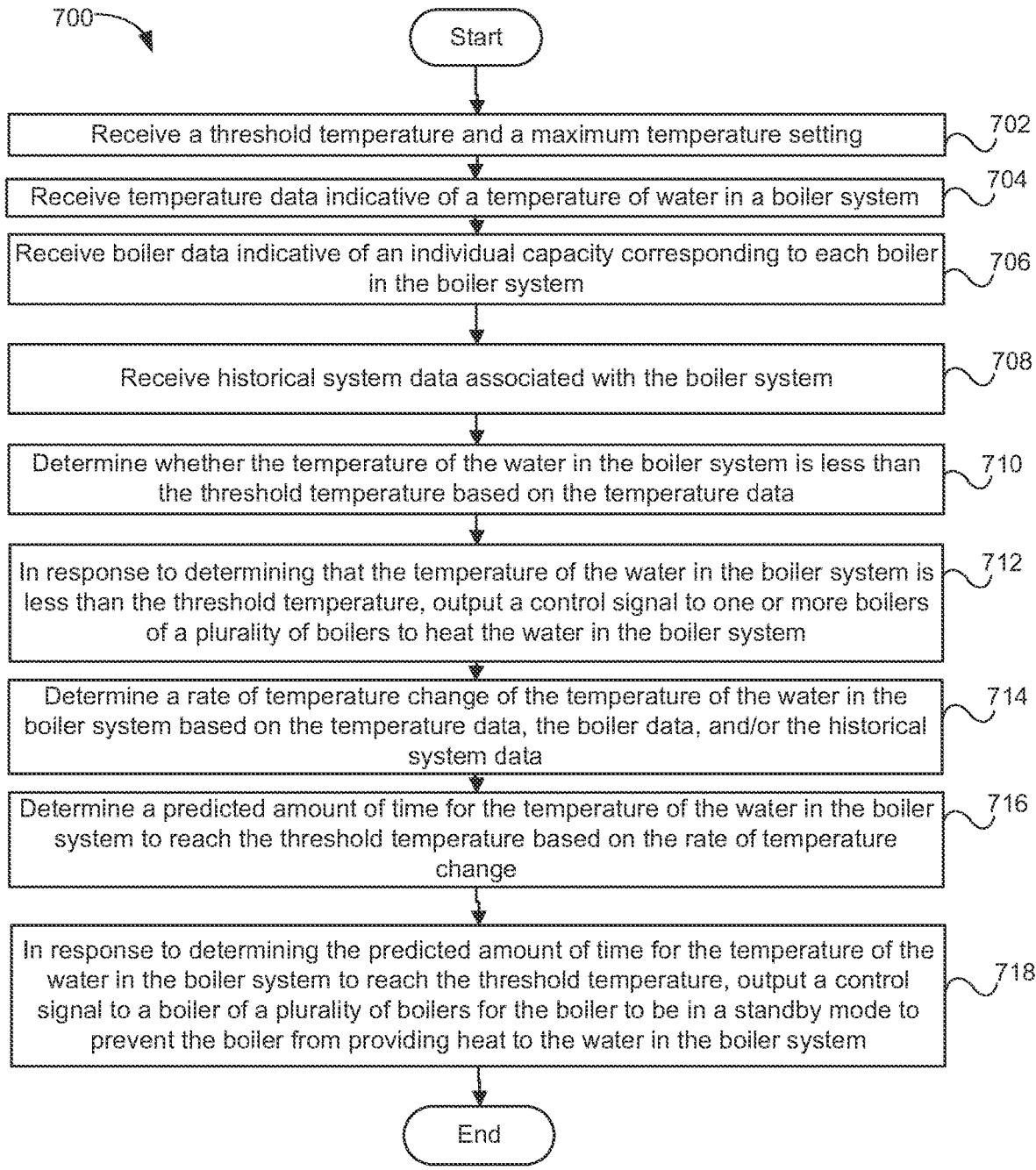
FIG. 7 illustrates a flowchart of an example method of controlling a cascade boiler system, in accordance with the disclosed technology.

FIG. 7 depicts another example method 700 of operating a cascade boiler system according to the disclosed technology. Similar to the methods 500 and 600, the method 700 can include receiving 702 a threshold temperature and a maximum temperature setting. The maximum temperature setting can be based on, for example, the threshold temperature and a differential temperature setting (e.g., the maximum temperature can be half the temperature differential added to the threshold temperature). The method 700 can include receiving 704 temperature data indicative of a temperature of water in a boiler system, receiving 706 boiler data indicative of an individual capacity of each boiler in the boiler system, and receiving 708 historical system data associated with the boiler system. The historical boiler data can be, for example, historical temperature data, historical flow rates, historical boiler output, or other historical data that can relate to the operation of the boiler system. The method 700 can include determining 710 whether the temperature of the water in the boiler system is less than the threshold temperature based on the temperature data. In response to determining 710 that the temperature of the water in the boiler system is less than the threshold temperature, the method 700 can include outputting 712 a control signal to one or more boilers of a plurality of boilers to heat the water in the boiler system. The method 700 can include determining 714 a rate of temperature change of the temperature of the water in the boiler system based on the temperature data, the boiler data, and/or the historical system data. The method can include determining 716 a predicted amount of time for the temperature of the water in the boiler system to reach the threshold temperature based on the rate of temperature change. In response to determining 716 the predicted amount of time for the temperature of the water in the boiler system to reach the threshold temperature, the method 700 can include outputting 718 a control signal to a boiler of a plurality of boilers for the boiler to be in a standby mode to prevent the boiler from providing heat to the water in the boiler system.

As will be appreciated, the methods 500, 600, and 700 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above.

Throughout this disclosure, reference is made to controlling the boiler system 100 based on a target temperature or threshold temperature. In many examples, the target temperature is referenced as being a temperature setpoint with a differential temperature range which spans temperatures that are greater than and less than the target temperature. As will be appreciated, the methods and systems described above can similarly be configured to operate based on a predetermined temperature that can be greater than or less than the target temperature with the boiler system still being configured to prevent system temperature overshoot.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

That which is claimed is:

1. A non-transitory, computer-readable medium storing instructions that, when executed by one or more processors, cause a controller associated with a boiler system to:
    receive a threshold temperature and a maximum temperature;
    receive, from a temperature sensor of the boiler system, temperature data indicative of a temperature of water in the boiler system;
    receive boiler data from one or more boilers of a plurality of boilers, the boiler data being indicative of an individual capacity corresponding to each boiler of the one or more boilers;
    determine, based on the temperature data, if the temperature of the water in the boiler system is less than or equal to the threshold temperature;
    in response to determining that the temperature of the water in the boiler system is less than or equal to the threshold temperature, output a control signal to a boiler of the plurality of boilers to heat the water in the boiler system;
    determine, based on the temperature data and the boiler data, a rate of temperature change of the temperature of the water in the boiler system;
    determine, based on the rate of temperature change, a predicted amount of time for the temperature of the water in the boiler system to reach the threshold temperature; and
    in response to determining the predicted amount of time for the temperature of the water in the boiler system to reach the threshold temperature, output a control signal to the boiler of the plurality of boilers to control an output of the boiler.

2. The non-transitory, computer-readable medium of claim 1, wherein outputting a control signal to the boiler of the one or more boilers to control an output of the boiler comprises outputting a control signal for the boiler to operate in a standby mode to prevent the boiler from providing heat to the water in the boiler system.

3. The non-transitory, computer-readable medium of claim 1, wherein outputting a control signal to the boiler of the one or more boilers to control an output of the boiler comprises outputting a control signal for the boiler to modulate an output of the boiler to a lower individual capacity to reduce the amount of heat the boiler is adding to the water in the boiler system.

4. The non-transitory, computer-readable medium of claim 1, wherein the instructions, when executed by one or more processors, further cause the controller to:
    receive historical system data associated with the boiler system,
    wherein determining the rate of temperature change of the temperature of the water in the boiler system is further based on based on the historical system data.

5. The non-transitory, computer-readable medium of claim 1, wherein the plurality of boilers comprises at least one condensing boiler and one non-condensing boiler.

6. A cascade boiler system comprising:
    the non-transitory, computer-readable medium according to claim 1;
    one or more processors configured to execute the instructions stored on the non-transitory, computer-readable medium;
    one or more controllers in operable communication with the processors; and
    a plurality of boilers operatively coupled to the one or more controllers.

7. The cascade boiler system of claim 6, wherein the plurality of boilers comprises at least one condensing boiler and one non-condensing boiler.

8. The cascade boiler system of claim 6, which is configured to output a control signal to a boiler of the plurality of boilers to modulate an output of the boiler to a lower individual capacity to reduce the amount of heat the boiler is adding to the water in the boiler system.

9. The cascade boiler system of claim 6, which is configured to output a control signal to a boiler of the plurality of boilers to operate in a standby mode to prevent the boiler from providing heat to the water in the boiler system.

10. The cascade boiler system of claim 6, further comprising one or more temperature sensors, wherein the controller is configured to receive, from at least one of the one or more temperature sensors, temperature data indicative of a temperature of water in the boiler system.

* * * * *